(12) United States Patent
Tubota

(10) Patent No.: US 7,886,489 B2
(45) Date of Patent: Feb. 15, 2011

(54) SYSTEM FOR BUFFERING HORIZONTAL ACCELERATION ACTING ON STRUCTURAL MEMBER AND POSITION RETURNING UNIT

(76) Inventor: Hiroyasu Tubota, 25-1, Tukui 3-chome, Yokosuka-shi, Kanagawa 239-0843 (JP)

( * ) Notice: Subject to any disclaimer, the term of this patent is extended or adjusted under 35 U.S.C. 154(b) by 0 days.

(21) Appl. No.: 11/664,595

(22) PCT Filed: Feb. 3, 2005

(86) PCT No.: PCT/JP2005/001980

§ 371 (c)(1),
(2), (4) Date: Apr. 4, 2007

(87) PCT Pub. No.: WO2006/038313

PCT Pub. Date: Apr. 13, 2006

(65) Prior Publication Data
US 2008/0066398 A1    Mar. 20, 2008

(30) Foreign Application Priority Data
Oct. 4, 2004    (JP)    ............................... 2004-317142

(51) Int. Cl.
*E04B 1/98*    (2006.01)
*E04H 9/02*    (2006.01)
(52) U.S. Cl. ...................... 52/167.5; 52/167.4
(58) Field of Classification Search ........ 52/167.1–167.9
See application file for complete search history.

(56) References Cited

U.S. PATENT DOCUMENTS

| | | | | | |
|---|---|---|---|---|---|
| 4,687,174 | A | * | 8/1987 | Helary et al. | ................ 248/638 |
| 4,883,250 | A | * | 11/1989 | Yano et al. | ................ 248/638 |
| 4,974,378 | A | * | 12/1990 | Shustov | ................ 52/167.5 |
| 5,288,060 | A | * | 2/1994 | Tyutinman | ................ 267/154 |
| 5,689,919 | A | * | 11/1997 | Yano | ................ 52/167.6 |
| 6,085,473 | A | * | 7/2000 | Teramachi et al. | ................ 52/167.5 |
| 6,092,780 | A | * | 7/2000 | Kurabayashi et al. | ................ 248/636 |
| 6,125,596 | A | * | 10/2000 | Goto | ................ 52/167.4 |
| 6,164,022 | A | * | 12/2000 | Ishikawa et al. | ................ 52/167.5 |
| 6,321,492 | B1 | * | 11/2001 | Robinson | ................ 52/167.1 |
| 6,631,593 | B2 | * | 10/2003 | Kim | ................ 52/167.9 |
| 6,672,573 | B2 | * | 1/2004 | Berton | ................ 267/136 |
| 6,862,849 | B2 | * | 3/2005 | Kim | ................ 52/167.9 |
| 6,951,083 | B2 | * | 10/2005 | Kim | ................ 52/167.9 |
| 6,966,154 | B1 | * | 11/2005 | Bierwirth | ................ 52/167.4 |

(Continued)

OTHER PUBLICATIONS

Communication received from the Chinese Patent Office in a corresponding application, mailed Jul. 4, 2008 (5 pages).

*Primary Examiner*—Basil Katcheves
*Assistant Examiner*—Andrew J Triggs
(74) *Attorney, Agent, or Firm*—Kratz, Quintos & Hanson, LLP

(57) ABSTRACT

A position returning device rollers for absorbing a horizontal force acting on a structure are provided between a foundation and a structure. A force from an earthquake is absorbed as the rolling motion of the rollers, roll in roller receivers. The receivers which function as a returning unit, supporting the rollers have a concave shape, and the action of the rollers naturally return to the center of the roller receivers by gravity. Gears disposed on the rollers at intersecting portions of the rollers mesh and maintain a constant angle at which the rollers intersect.

3 Claims, 2 Drawing Sheets

U.S. PATENT DOCUMENTS

| | | | |
|---|---|---|---|
| 7,237,364 B2 * | 7/2007 | Tsai | 52/167.6 |
| 2002/0166296 A1 * | 11/2002 | Kim | 52/167.5 |
| 2005/0241245 A1 * | 11/2005 | Tsai | 52/167.1 |
| 2006/0000159 A1 * | 1/2006 | Tsai | 52/167.4 |
| 2008/0066398 A1 * | 3/2008 | Tubota | 52/167.5 |

* cited by examiner

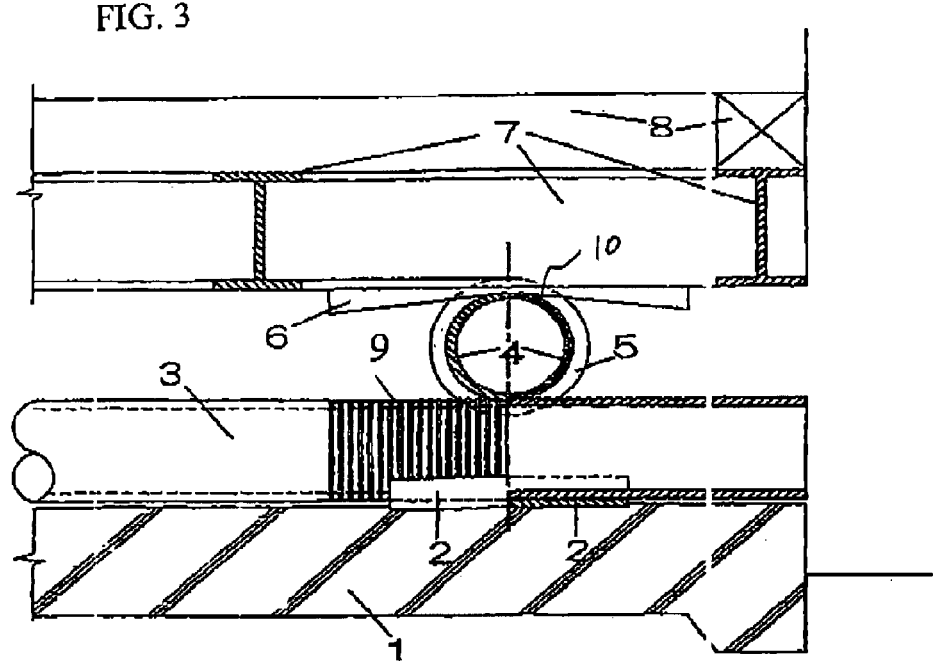
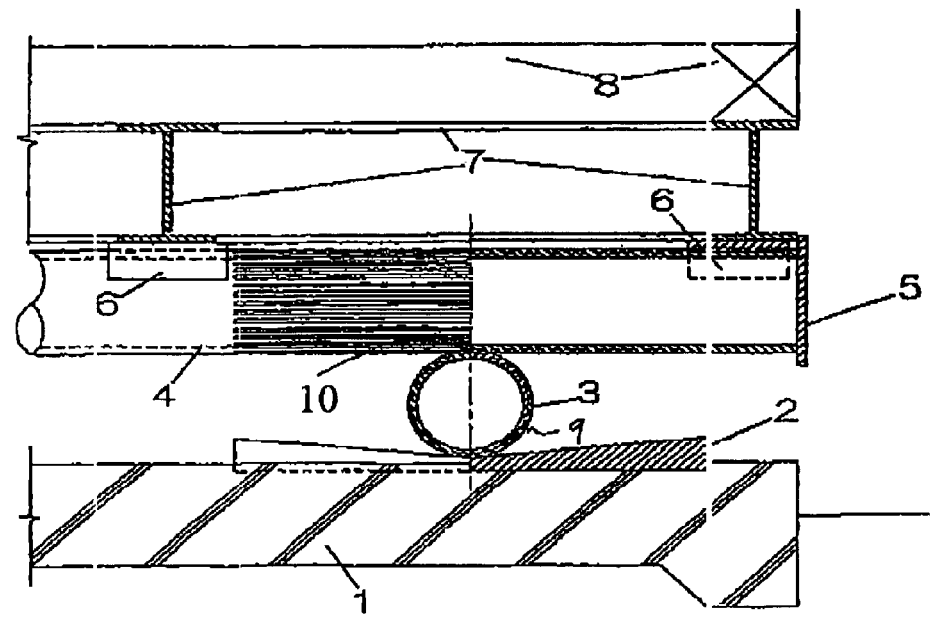

SYSTEM FOR BUFFERING HORIZONTAL ACCELERATION ACTING ON STRUCTURAL MEMBER AND POSITION RETURNING UNIT

RELATED APPLICATIONS

This application claims priority under 35 U.S.C. §371 of International Application No. PCT/JP2005/001980, filed on Feb. 3, 2005, which application claims priority under 35 U.S.C. §119 of Japanese Application No. 2004-317142, filed Oct. 4, 2004, the contents of which are incorporated herein by reference.

FIELD OF THE INVENTION

Quake-absorbing system

BACKGROUND OF THE INVENTION

A conventional quake-absorbing system prevents transmission of horizontal force generated by an earthquake and the like to a structure by absorbing the force by a sliding motion and a rolling motion. Further, a position returning unit makes use of tensile stress of rubber or hydraulic stress is ordinarily provided separately.

DISCLOSURE OF THE INVENTION

Problems to be Solved by the Invention

A horizontal force absorbing unit and a position returning unit of a conventional quake-absorbing system which are arranged as separate structures are arranged integrally.

In the conventional quake-absorbing system, although the contact portions of a sliding surface and a rolling surface must be maintained and kept clean, there is provided a structure which makes it difficult to maintain anti clean the contact portions.

Since the conventional quake-absorbing system is constructed of a complex internal structure with precise components including a special rubber member, a hydraulic unit, and the like, it is very difficult for a manufacturer of the system to check the system to maintain the performance of it because there is a possibility that the system deteriorates as times passes and the components are firmly fastened. Accordingly, in the present invention, there is provided a structure arranged without using a special material, a complex internal structure, and precise components.

Means for Solving the Problems

To solve the above problems, the present invention employs neither special materials nor special structures for all the components and members constituting a system. That is, the present invention employs ordinary commercially available materials for the system and applies no sophisticated technology to the structure of the system in its entirety. The system has an arrangement which does not have an internal structure so that a degree of function of the system can be checked from the outside appearance thereof.

To overcome the first and second objections, horizontal force makes use of rotation of rollers 4, 3 intersecting in an up-down direction. As a position returning unit, concave-shaped roller receivers 2 having an inclining surface are fixed to a foundation 1 as support members of the rollers 3, and an inverse-concave-shaped roller receivers 6 are fixed to a mount 7 as support members of the rollers 4.

When the rollers 4 and 3 which intersect in the up-down direction are subjected to decentering force due to dislocation of the center of a structural member from the center of gravity thereof, the intersecting angle of the intersecting rollers is twisted. To prevent the intersecting angle from being twisted, teeth are formed on the intersecting portions of the intersecting rollers so that they are meshed with each other.

Projecting plates are fixed to outer end portions of the rollers 4 for supporting the mount 7 to prevent side surface movement of the mount 7 so that the structural member 8 does not drop.

ADVANTAGE OF THE INVENTION

As described above, since the system of the present invention is simply arranged without an internal structure and does not require any special material, electric and electronic component, or a hydraulic unit, the function of the system can be maintained without the necessity of checking and replacing components after the system is installed.

BEST MODE FOR CARRYING OUT THE INVENTION

An embodiment of the present invention will be explained below based on FIGS. 1 to 4.

In the figures, reference numeral 1 denotes a foundation, 2 denotes roller receivers disposed on the foundation to support cylindrical rotatable rollers 3, 4 denotes cylindrical rotatable rollers, 5 denotes projecting plates fixed to the rollers 4, 6 denotes roller receivers for supporting the rollers 4, 7 denotes a mount on which the roller receivers 6 are fixed, and 8 denotes a structural member. Reference numeral 9 denotes gears disposed in circumferential directions on rollers 3 and reference numeral 10 denotes gears disposed in longitudinal directions on rollers 4. The gears are disposed OIL intersecting portions of the rollers and maintain a constant angle at which the rollers intersect. Gears 9 mesh with gears 10.

Next, operation of the above arrangement will be explained. When the foundation 1 is moved in a horizontal direction by horizontal force caused by an earthquake, the rollers 3 and 4 which intersect in an up-down direction are turned in X- and Y-directions, respectively and absorb the horizontal force. Further, since each of the roller receivers 2 and 6 acting as a position returning unit has a concave cross section inclining toward a center as shown in the figures, when the horizontal force stops, the rollers 3 and 4 return toward the centers of the roller receivers 2, 6 by gravity, thereby the structural member 8 returns to a position at which it was located before the earthquake occurred together with the mount 7.

The projecting plates 5 fixed to the rollers 4 stop movement of the mount 7 to a side surface to prevent slip of the structural member 8.

As shown in the embodiment, although the system of the present invention is arranged to have a very simple structure, the structure is excellent in that it satisfies functions required for a quake-absorbing system such as sufficient support resistance, a horizontal force absorbing effect, a returning capability, elimination of eigencycle, and the like.

BRIEF DESCRIPTION OF THE DRAWINGS

FIG. 3 is a detailed sectional view taken along a line A-A.
FIG. 4 is a detailed sectional view taken along a line B-B.

REFERENCE NUMERALS

Figure 1:
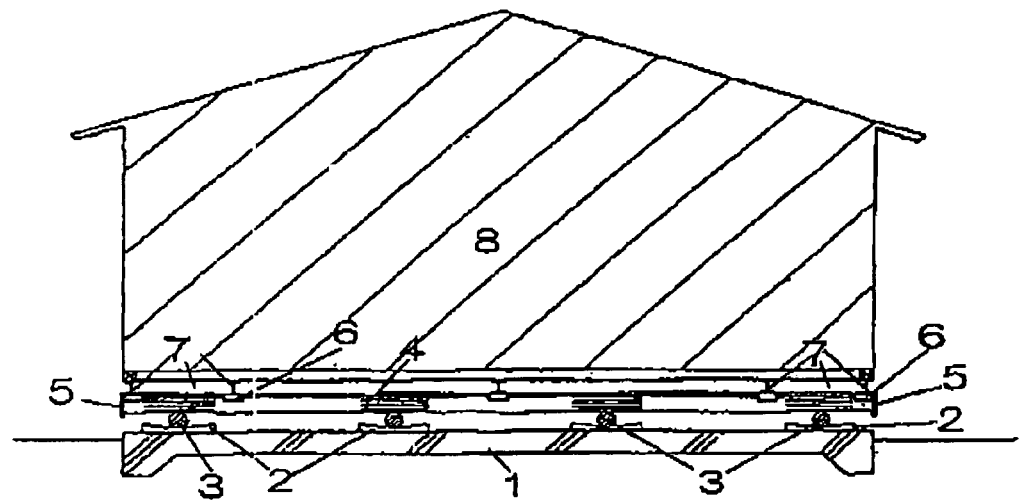
FIG. 1 is a sectional view taken along a line X-X to show an embodiment of the present invention.
Figure 2:
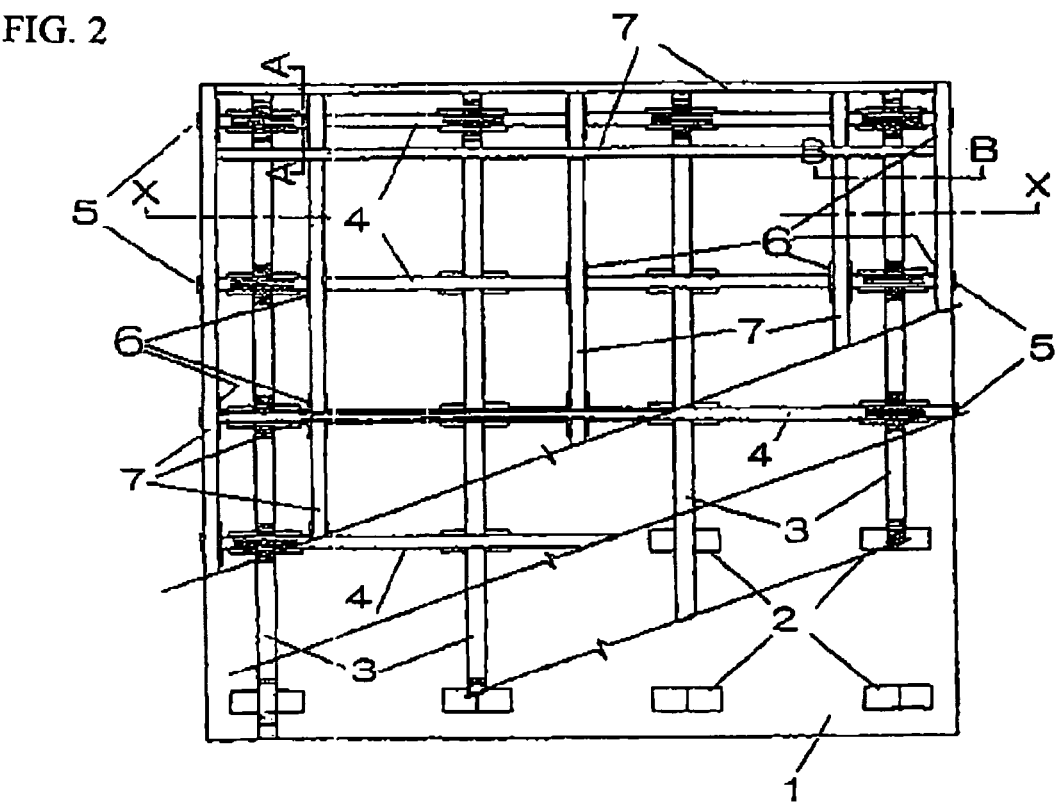
FIG. 2 is a plan view of a quake-absorbing system when it is viewed from above it.

1 foundation
2 roller receiver (facing upward)
3 roller
4 roller
5 projecting plate
6 roller receiver (facing downward)
7 mount
8 structural member

The invention claimed is:

1. A device for buffering horizontal acceleration acting on a structure, comprising:
 a first set and a second set of a plurality of cylindrical rotatable rollers having the first set of a plurality of cylindrical rotatable rollers intersecting the second set of a plurality of cylindrical rotatable rollers in an up-down direction and said first and second sets of a plurality of cylindrical rotatable rollers are interposed between a foundation of the structure and structure members of the structure, wherein said first and second sets of a plurality of cylindrical rotatable rollers support the structure in its entirety in the vertical direction and said first set of a plurality of cylindrical rotatable rollers directly contact said second set of a plurality of cylindrical rotatable rollers; and
 a pair of gears, formed directly on intersecting portions of each of the plurality of cylindrical rotatable rollers, in respective circumferential and longitudinal directions thereof with the gears in the circumferential direction directly contacting and meshing with the gears in the longitudinal direction, wherein said pairs of gears maintain a constant angle at which all of the plurality of cylindrical rotatable rollers intersect.

2. The device of claim 1, wherein the plurality of cylindrical rotatable rollers are continuous substantially rigid members so that the plurality of cylindrical rotatable rollers carry out the same motion when a structural member is subjected to force in the same direction or having the same magnitude even if the external end portions of the plurality of cylindrical rotatable rollers which intersect are subjected to force in a different direction or having a different magnitude due to decentering force, and the like, and uneven stress is generated between the plurality of cylindrical rotatable rollers.

3. A combination device of cylindrical rotatable rollers of claim 1 or 2 and receivers for the plurality of cylindrical rotatable rollers, said receivers having an inclined surface and a surface fixed to the foundation or the structure member, for returning the plurality of cylindrical rotatable rollers to a predetermined position by gravity, following rotation of the plurality of cylindrical rotatable rollers by horizontal acceleration acting on the structure.

* * * * *